US007970771B2

(12) United States Patent
Rasmussen et al.

(10) Patent No.: US 7,970,771 B2
(45) Date of Patent: Jun. 28, 2011

(54) METHOD AND SYSTEM FOR TRACKING OBJECTS ASSOCIATED WITH AN ACTIVITY

(75) Inventors: David Rasmussen, Redmond, WA (US); Christopher H. Pratley, Seattle, WA (US); Owen Braun, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 11/019,103

(22) Filed: Dec. 20, 2004

(65) Prior Publication Data

US 2006/0136357 A1 Jun. 22, 2006

(51) Int. Cl.
*G06F 7/00* (2006.01)
*G06F 17/30* (2006.01)
*G06Q 10/00* (2006.01)

(52) U.S. Cl. .............................. 707/748; 707/754; 705/8

(58) Field of Classification Search ................... 707/100, 707/201, 101, 2, 1, 999.107, 999.009, 736, 707/754; 715/200–277; 370/352; 725/46, 725/14; 705/8
See application file for complete search history.

(56) References Cited

U.S. PATENT DOCUMENTS

| | | | | |
|---|---|---|---|---|
| 5,721,913 A | * | 2/1998 | Ackroff et al. | 707/103 R |
| 5,924,103 A | * | 7/1999 | Ahmed et al. | 707/201 |
| 6,148,294 A | * | 11/2000 | Beyda et al. | 707/1 |
| 7,197,570 B2 | * | 3/2007 | Eylon et al. | 709/231 |
| 7,290,007 B2 | * | 10/2007 | Farber et al. | 707/103 R |
| 2003/0149708 A1 | * | 8/2003 | Tsao | 707/104.1 |
| 2004/0073615 A1 | * | 4/2004 | Darling | 709/206 |
| 2004/0199507 A1 | * | 10/2004 | Tawa, Jr. | 707/7 |
| 2004/0227768 A1 | * | 11/2004 | Bates et al. | 345/589 |
| 2004/0249820 A1 | * | 12/2004 | Cooper et al. | 707/100 |
| 2005/0183143 A1 | * | 8/2005 | Anderholm et al. | 726/22 |
| 2006/0036570 A1 | * | 2/2006 | Schaefer et al. | 707/1 |
| 2006/0050686 A1 | * | 3/2006 | Velez-Rivera et al. | 370/352 |
| 2006/0053380 A1 | * | 3/2006 | Spataro et al. | 715/753 |
| 2009/0276464 A1 | * | 11/2009 | Bandas | 707/104.1 |

* cited by examiner

*Primary Examiner* — Mohammad Ali
*Assistant Examiner* — Bao G Tran
(74) *Attorney, Agent, or Firm* — Merchant & Gould

(57) ABSTRACT

An object tracking module establishes relationships between different types of data objects associated with application programs while a particular activity occurs. Contextual information associated with the data objects and the activity is collected to establish the relationship. The contextual information may include data objects that are accessed or created while the activity is in progress, or any other information associated with the activity. When an event related to the activity occurs, the object tracking module locates data relevant to the event based on the established relationships. The relevant data is presented in the same information space where the event occurs. A user may easily access the relevant information without manually searching for the data. The object tracking module may determine the degree of relevance between the data objects and the event such that only the most relevant objects are displayed.

17 Claims, 4 Drawing Sheets

METHOD AND SYSTEM FOR TRACKING OBJECTS ASSOCIATED WITH AN ACTIVITY

BACKGROUND OF THE INVENTION

Computer users often collect information associated with a certain topic, person or activity at different times. Retrieving information that is relevant at an appropriate time can prove difficult as the user may be uncertain where all of the pertinent information is stored. For example, when a salesperson receives a telephone call from a customer, the salesperson may have trouble quickly accessing all of the information related to the customer that is stored on the computer.

The content stored on a user's hard drive may be indexed by a text search engine. A key word search may be performed to locate content that includes the key word. An implicit query may be performed to identify key words as they are entered into an application. Any content that includes the key word may be displayed to the user for quick access. However, the text search limits the types of content that may be located because some relevant information may not include the key word.

SUMMARY OF THE INVENTION

The present invention is directed to a method and system for tracking objects associated with an activity. An object tracking module is associated with a variety of different application programs. The object tracking module establishes relationships between different types of data objects associated with the application programs while a particular activity occurs. The activity can be any computing operation detectable by the object tracking module. The relationship between the data object and the activity is established by collecting contextual information. The contextual information may include data objects that are accessed or created while the activity is in progress, or any other information associated with the activity.

When an event related to the activity occurs, the object tracking module locates data relevant to the event based on the established relationships. The relevant data is presented in the same information space where the event occurs. A user may easily access the relevant information without manually searching for the data. The object tracking module may determine the degree of relevance between the data objects and the event such that only the most relevant objects are displayed. Relevance may be determined based on the number of links between the objects or the distance between objects related by transient contextual information. User feedback and key word searches may also be used to determine the relevance of objects to an event.

DETAILED DESCRIPTION OF THE PREFERRED EMBODIMENT

An object tracking module establishes relationships between different types of data objects associated with application programs while a particular activity occurs. Contextual information associated with the data objects and the activity is collected to establish the relationship. The contextual information may include data objects that are accessed or created while the activity is in progress, or any other information associated with the activity. When an event related to the activity occurs, the object tracking module locates data relevant to the event based on the established relationships. The relevant data is presented in the same information space where the event occurs. A user may easily access the relevant information without manually searching for the data. The object tracking module may determine the degree of relevance between the data objects and the event such that only the most relevant objects are displayed. Relevance may be determined based on the number of links between the objects or the distance between objects related by transient contextual information. User feedback and key word searches may also be used to determine the relevance of objects to an event.

Illustrative Operating Environment

Figure 1:
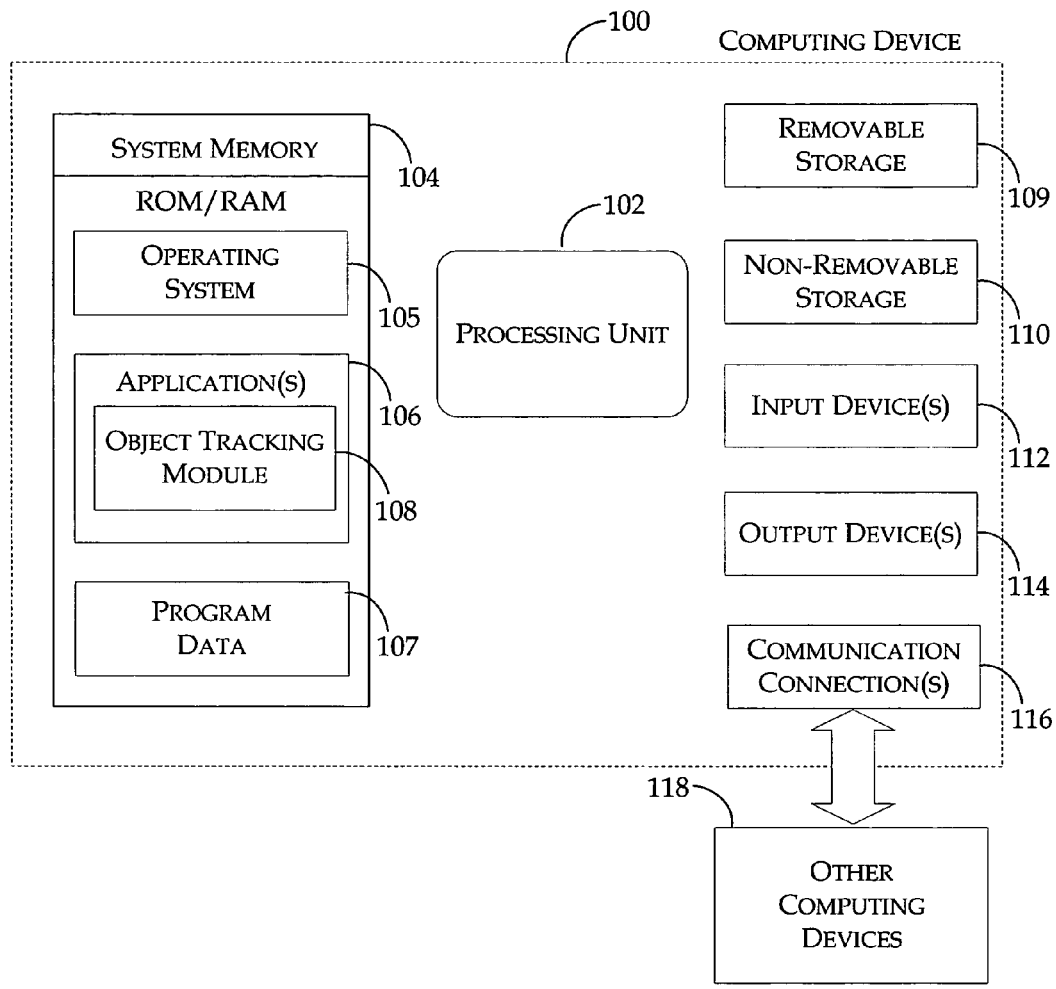
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. An object tracking module 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Tracking Objects Associated with an Activity

Figure 2:
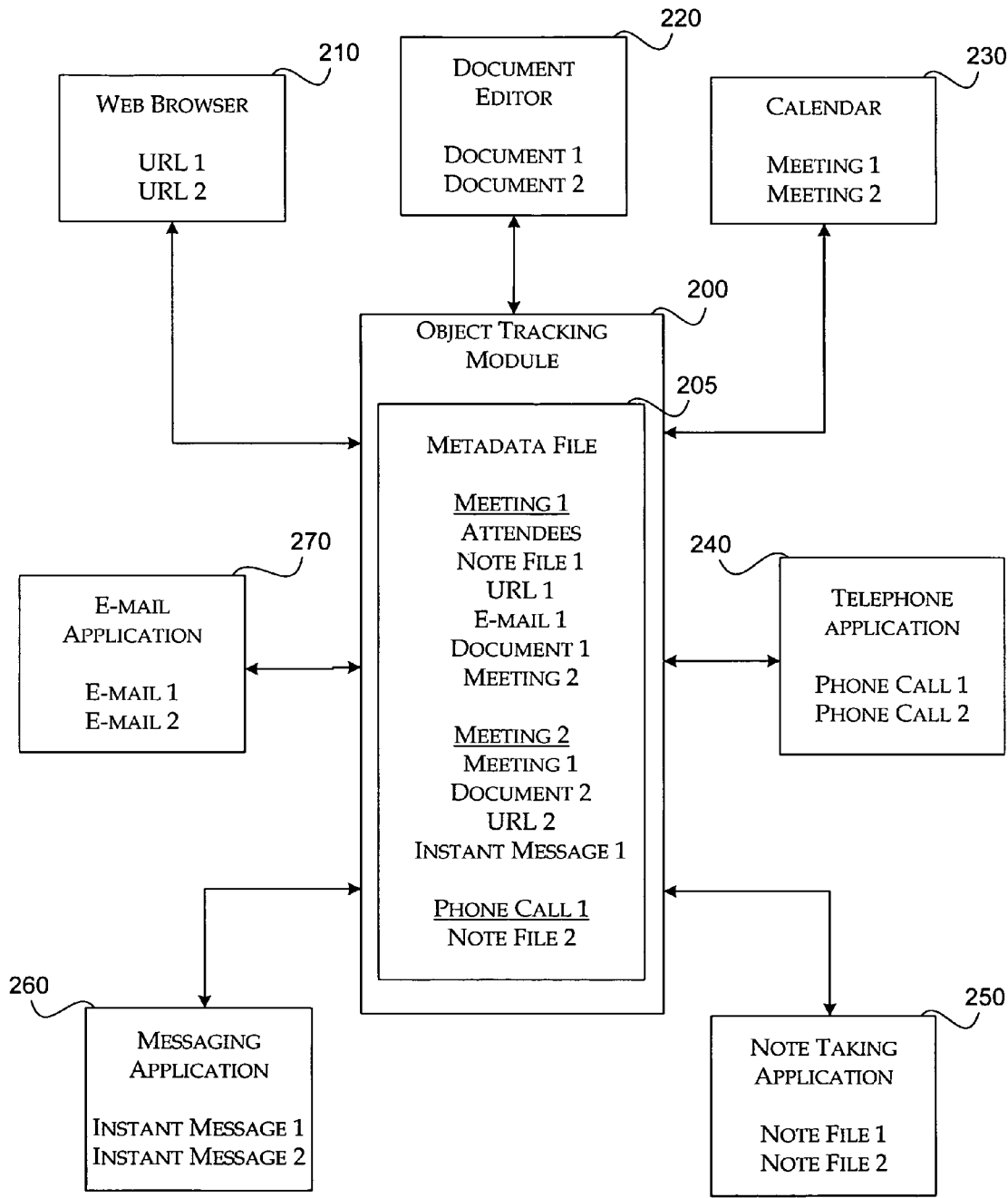
FIG. 2 illustrates a block diagram of a system for tracking objects associated with an activity, in accordance with the present invention.

FIG. 2 illustrates a block diagram of a system for tracking objects associated with an activity. The system includes object tracking module 200 coupled to a variety of application programs. The application programs may include web browser 210, document editor 220, calendar 230, telephone application 240, note taking application 250, messaging application 260, and e-mail application 270. Each application program is associated with corresponding data files. For example, web browser 210 may include references to web content via uniform resource locators (e.g., URL 1, URL 2); document editor may associated with a number of documents (e.g., document 1, document 2); calendar may include information related to tasks, appointments, meetings, and critical dates (e.g., meeting 1, meeting 2); telephone application may include a record of telephone conversations and any related contact information (e.g., phone call 1, phone call 2); note taking application may include note files (e.g., note file 1, note file 2); messaging application may include records of instant messenger conversations and any related contact information (e.g., instant message 1, instant message 2); and e-mail application may include a record of e-mail messages and any related contact information (e.g., e-mail 1, e-mail 2).

Object tracking module 200 establishes relationships between different types of data objects while a particular activity occurs. A relationship may be established between any data objects that may be reasonably associated. The relationship is established by collecting contextual information associated with the data object when the data object is accessed or created. Object tracking module 200 may also establish a relationship with other data that may be associated with the activity. In one embodiment, links are established between related objects using metadata. Object tracking module 200 stores information about the relationship established with objects and activities in metadata file 205.

For example, a user may schedule a meeting (e.g., meeting 1) on calendar 230 for a specific duration of time. During the scheduled meeting time, the user may record notes in note file 1 of note taking application 250, browse to URL 1 in web browser 210, send an e-mail message (e.g., e-mail 1) using e-mail application 270, edit document 1 in document editor 220, and schedule meeting 2 in calendar 230. Object tracking module 200 establishes a relationship between meeting 1 and the data accessed and/or created during the scheduled meeting time (e.g., note file 1, URL 1, e-mail 1, document 1, and meeting 2). Object tracking module 200 may also determine other information to associate with meeting 1 (e.g., the meeting attendees and their related contact information). The contextual information collected by object tracking module 200 and the relationships established between the data objects and the activity may be stored in metadata file 205.

At a later time, an event related to the activity may occur. Object tracking module 200 locates data relevant to the event based on the established relationships. The relevant data is presented to a user in the same information space where the event occurs. Thus, the user may easily access the relevant information without manually searching for the data.

For example, the scheduled time for meeting 2 arrives. Object tracking module 200 assumes that the user is in attendance at the meeting. Since meeting 2 was scheduled on calendar 230 during meeting 1, data collected during meeting 1 may also be relevant to the user during meeting 2. Thus, object tracking module 200 presents the user with the data that was collected during meeting 1 at the time when meeting 2 begins. The user may then easily access contact information of attendees at meeting 1, note file 1, URL 1, e-mail 1, and document 1.

Object tracking module 200 continues to establish relationships between data objects during meeting 2. For example, document 2 and URL 2 may be accessed during meeting 2. The user may also participate in an instant message conversation during meeting 2. Therefore, a relationship is established between this information (e.g., document 2, URL 2, and instant message 1) and meeting 2.

Object tracking module 200 may also collect transient contextual information. For example, a user may be taking notes in note file 2 while on the phone with a colleague (e.g., phone call 1). Object tracking module 200 establishes a relationship between phone call 1 and note file 2. The next time that the user accesses note file 2, object tracking module 200 may present the user with a phone number associated with phone call 1. The user may also be prompted with a statement such as, "The last time you accessed this note file you were speaking with your colleague. Here is his telephone number." In another example, object tracking module 200 may establish a transient contextual relationship between a document and a customer because the user accessed the document during a meeting or telephone conversation with the customer. In a subsequent meeting with the customer, object tracking module 200 presents the document to the user.

Contextual information about data is collected by associating the data object with an activity that occurs when the data object is created or viewed. Relationships may be established whenever a reasonable association can be made between data objects. Most relationships are established by chronological context (i.e., simultaneously occurring events within the information space).

Figure 3:
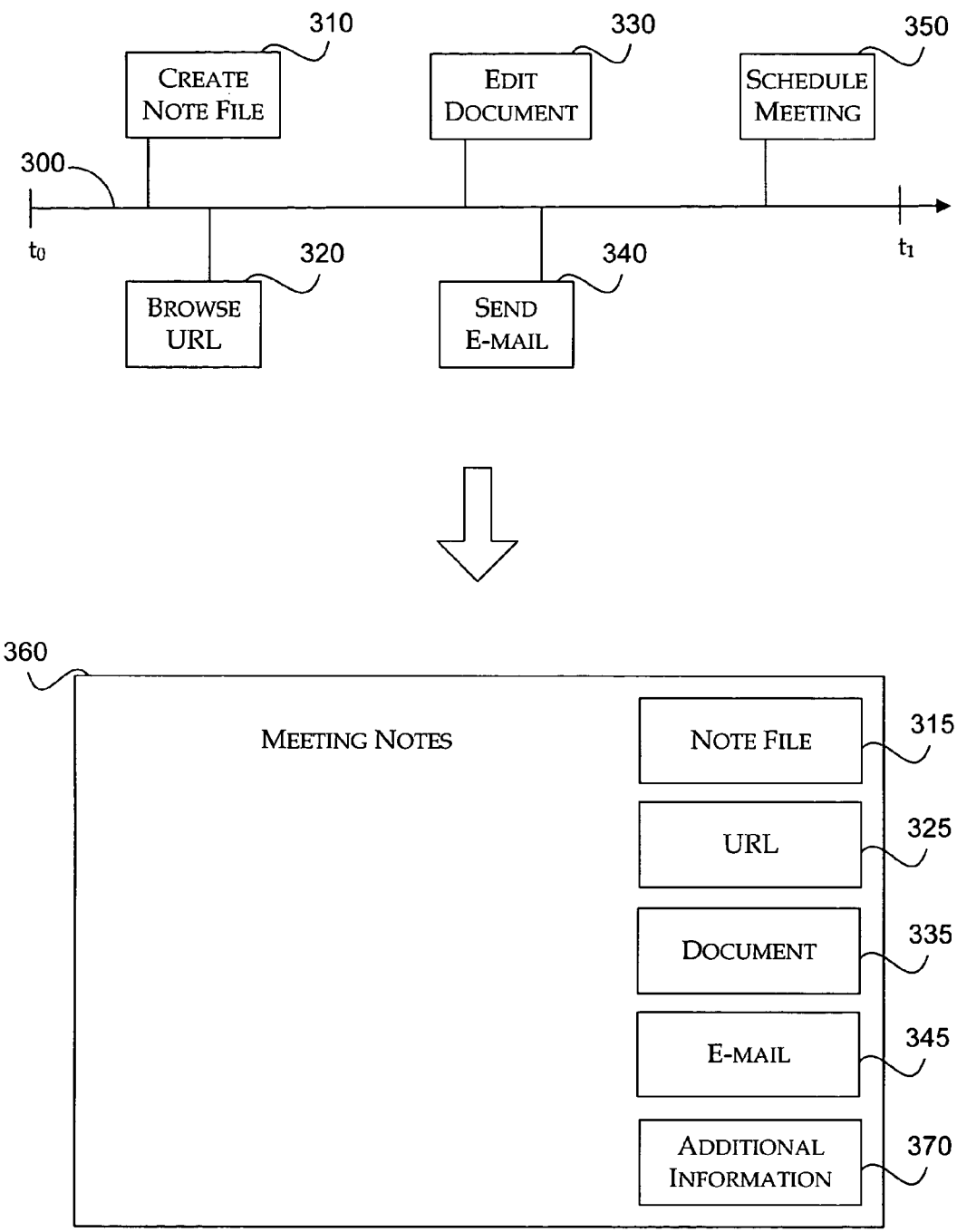
FIG. 3 illustrates a timeline of data objects that may be accessed or created while an activity is performed, and an example display that presents relevant information related to the activity, in accordance with the present invention.

FIG. 3 illustrates a timeline of data objects that may be accessed or created while an activity is performed, and an example display that presents relevant information related to the activity. Activity timeline 300 represents the duration of time (from time to $t_0$ time $t_1$) that an activity is performed. The activity can be any computing operation detectable by the object tracking module. Examples include attending a meeting, engaging in a telephone conversation, browsing the web, and editing a document. To simplify understanding, FIG. 3 is described with reference to the activity of engaging in a telephone conversation.

Integration between telephone and computer technology allows contextual information about a telephone call to be associated with user actions performed on the computer. Thus, a relationship may be established between a person (e.g., a client) that a user is speaking to on the telephone and the actions performed by the user during the telephone conversation. During the course of the telephone conversation, the user may create note file 310, browse to URL 320, edit document 330, send e-mail 340, and schedule a meeting with the person on the telephone 350.

The related information is displayed when the information is relevant to the user. The information is relevant to the user when an event occurs that is associated with the original telephone conversation. For example, when the scheduled meeting time arrives, the object tracking module locates the relevant information associated with the telephone conversation. The relevant information is displayed in the same information space as the occurrence of the event. In one embodiment, the information may be displayed on monitor 360 of a computing device that has a note taking application loaded. Any other relevant information associated with the telephone conversation may also be displayed. Thus, at the time of the scheduled meeting, the user is presented with note file icon 315 corresponding to note file 310, URL icon 325 corresponding to URL 320, document icon 335 corresponding to document 330, and e-mail icon 345 corresponding to e-mail 340. Additional information may also be displayed as icon 370. Additional information may include personal information associated with the client (contact information, educational background, work history, family information, etc.), and other relevant information associated with the telephone conversation. For example, a list of e-mail messages sent to or received from the client may be present to the user.

During the meeting, the user may access any of the relevant information displayed on monitor 360 by selecting any of the displayed icons. Thus, the user may easily access relevant information associated with the telephone conversation. The user may take additional notes as the meeting progresses. The object tracking module establishes a relationship between the resulting note file and the meeting during which the note file was created. The object tracking module also associates the note file with the telephone conversation between the user and the client during which the meeting was scheduled (i.e., transient contextual relationship).

In one embodiment, a user may want to review all notes that are related to a specific customer. The user may select the most recent note file that is associated with the customer. All subsequent note files related to the customer may then be displayed to the user. The subsequent note files may have been taken during a meeting with the client, while speaking with the client on the telephone, or the note files may include information that identifies the client within the body of the file. The note files may be displayed in chronological order or according to relevance. The note files may also be associated with other data objects such that the user may access other information that is transiently related to the customer.

In another embodiment, a user may be researching a topic on the web. The user may take notes while browsing the web. The object linking module establishes a relationship between the notes and the web page that is open in the browser at the time the notes are taken. Later, the user may review the notes before writing a formal research document. The relationship between the notes and the web pages allows the user to easily determine the web location of the information. In one embodiment, the user may link to the URL of a web page associated with a particular note by selecting the note container.

In another embodiment, a user is speaking to a client on the telephone. During the telephone conversation, the user takes notes and creates a task in a calendar application. An example task could be to call the client at a specific time, or prepare a document for the client. The object linking module establishes a relationship between the task and the client, the telephone conversation, and the notes. All of this information may be useful to the user while performing the task. The object linking module may then provide the user with a task-focused view of the relevant information when the user accesses the task from the calendar.

As the current user activity changes in the information space the displayed information also changes. For example, the user may continue to take notes during the meeting. The notes may be related to more relevant information than the data objects associated with the displayed icons. The object tracking module determines the most relevant information to display on monitor 360.

The number of relevant data objects associated with an event may become so large that not all of them can be neatly displayed within the information space. A key word search may be performed to reduce the number of displayed objects. A text search may also be performed on all data objects to obtain relevant information that may not be directly linked or associated with an event.

The object tracking module determines the relative degree of relevance between two data objects and assigns a weight to the link between the objects. In one embodiment, Bayesian learning is used to determine the degree of relevance between data objects. Directly linked data objects are assigned a high degree of relevance. Multiple direct links between two data objects suggest an even higher degree of relevance. Two data objects that are indirectly linked through an extended path of transient contextual information are assigned a low degree of relevance.

For example, a user may access the same document every time the user meets with the client or speaks with the client on the telephone. Therefore, the document is highly relevant to the client. Likewise, if a document was only accessed once during several meetings/phone conversations with the client, the document may be unrelated to the client (i.e., the user may have accessed the document for some other reason).

Relevance may also be determined based on user intent. For example, the user may be taking notes in a note taking application while several different documents are open. Some of the documents may not be visible on the screen (i.e., the documents may be minimized or positioned behind other documents). Thus, a relationship is established between the note file and the documents that are visible to the user while the notes are taken. The likelihood that the notes are relevant to the open documents that are not visible to the user is low, so a relationship would not be established with those documents.

The user may provide feedback about the relevance of information. The feedback may be used to weigh the relevance between associated objects. For example, a user may access a document during a meeting that is not related to the meeting. When note files related to the meeting are retrieved, the document is presented to the user as relevant information. The user may provide feedback to the object tracking module that the document is not associated with the meeting. The object tracking module may then determine that other objects associated with the document are also unrelated to the meeting.

Figure 4:
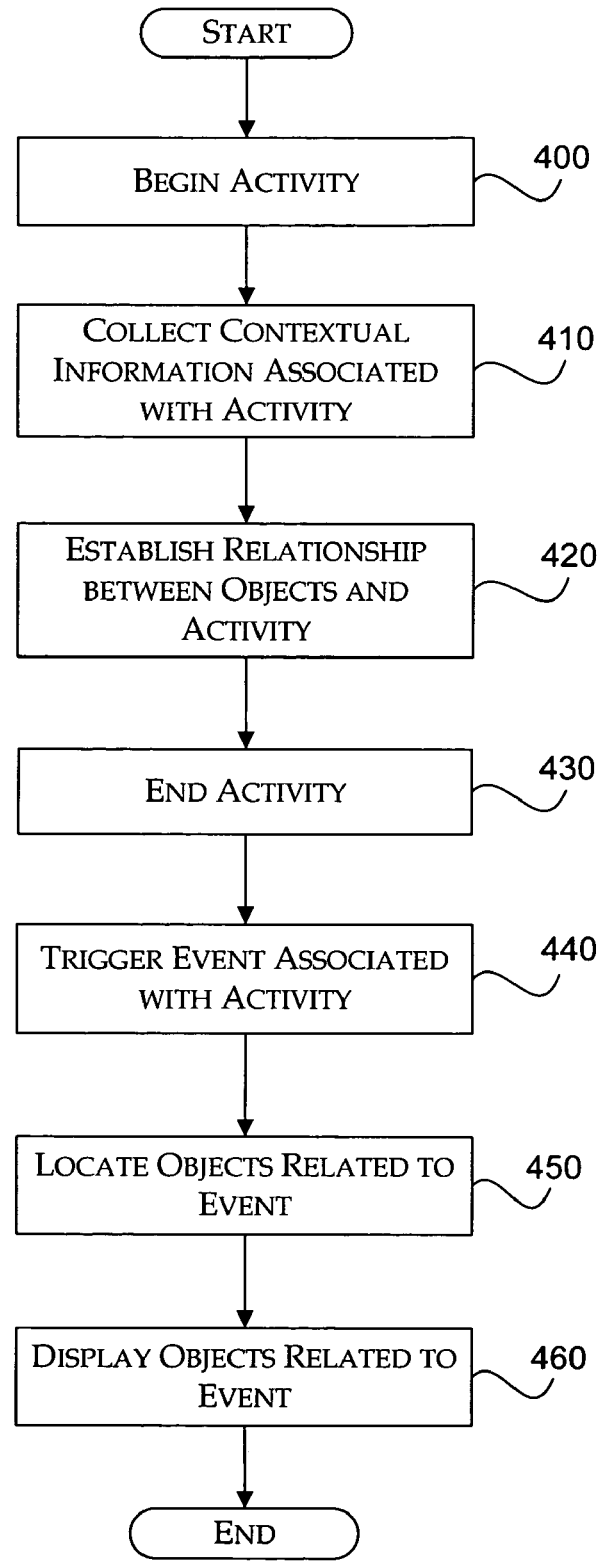
FIG. 4 illustrates an operational flow diagram illustrating a process for tracking objects associated with an activity, in accordance with the present invention.

FIG. 4 illustrates an operational flow diagram illustrating a process for tracking objects associated with an activity. The process begins at a start block where an object tracking module is associated with a variety of different application programs. The application programs may include a web browser, a document editor, a calendar, a telephone application, a note taking application, an instant messenger application, and an e-mail application.

Moving to block 400, an activity associated with an application program begins. Examples of activities include browsing the web, editing a document, making a telephone call, taking notes, engaging in an instant messaging conversation, and participating in a meeting. In one embodiment, the object tracking module determines that the activity has begun when a user accesses a file associated with the corresponding application program. In another embodiment, the object tracking module determines that the activity has begun when the time of a scheduled entry in an calendar application arrives. For example, the object tracking module determines that a user is attending a meeting when the meeting time scheduled in the calendar application arrives.

Proceeding to block 410, contextual information associated with the activity is collected. The contextual information may include data objects that are accessed or created while the activity is in progress, or any other information associated with the activity. For example, a user may be attending a meeting (the activity). During the course of the meeting the user may access an object to edit a document. The user may also create an object to take notes or browse the web. The object tracking module may collect other information associated with the activity. For example, the object tracking module may maintain a record of the meeting attendees, and the contact information associated with the attendees.

Advancing to block 420, a relationship is established between the activity and the associated data objects based on the contextual information. The object tracking module associates the data objects corresponding to the collected contextual information with the activity while the activity occurs. A relationship may also be established between related data objects. For example, a user may be speaking with a client on the telephone (the activity). During the course of the telephone conversation the user may access and create several data objects associated with different application programs. A relationship is established between the several data objects. Transient contextual relationships may be established between other information associated with the activity and the data objects. For example, the client's telephone number may be associated with documents edited during the course of the telephone conversation. In one embodiment, the relationships are established by linking the contextual information to the activity by metadata. The metadata that identifies the relationships associated with an activity may be stored in a metadata file.

Transitioning to block 430, the activity ends. In one embodiment, the object tracking module determines that the activity has ended when a user closes a file associated with the corresponding application program. For example, a user may be researching a topic on the web and taking notes while browsing the web. The activity ends when the web browser is closed. In another embodiment, the object tracking module determines that the activity has ended when the duration of a scheduled entry in an calendar application expires. For example, the object tracking module determines that a meeting has ended when the end of the meeting time scheduled in the calendar application arrives.

Continuing to block 440, an event associated with the activity is triggered. The event may be associated with the activity through the relationship established between the activity and the data objects. For example, a user may be engaged in an instant messenger conversation with a friend (the activity). During the course of the instant messenger conversation, the user may schedule a lunch appointment (the data object) with the friend in a calendar application. The event triggers when the time of the scheduled appointment arrives. In another example, while on the phone with a customer (the activity), a user edits a document (the data object). The event triggers when the user accesses the document at a later date.

Moving to block 450, data objects related to the event are located. In one embodiment, the data objects are located by accessing a metadata file associated with the event. Metadata in the metadata file identifies relationships between the event and the related data objects. The metadata may also identify where the data objects are stored. The data objects may be accessed from a local memory location that is associated with the application program corresponding to the object. The data objects may also be accessed from a server.

Proceeding to block 460, the data objects related to the event are displayed to the user. The objects may be displayed in the information space associated with the event. For example, the event may be the arrival of a scheduled meeting time. The object tracking module may determine that the user usually loads a note taking application from a laptop computer while attending the meeting. Thus, the note taking application may be loaded at the time of the meeting and the data objects relevant to the meeting are displayed on the monitor of the user's laptop computer. In one embodiment, the object tracking module determines the relevance of the objects to the event and displays only the most relevant objects. Relevance may be determined based on the number of links between the objects or the distance between objects related by transient contextual information. User feedback and key word searches may also be used to determine the relevance of objects to an event. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for utilizing tracking module contextual information on a client device, the method comprising:

providing an application independent tracking module on a client device, wherein the tracking module tracks different applications that are used on the client device; wherein the tracked applications comprise at least a calendar application, a telephone application and a document editing application;

the application independent tracking module performing actions relating to an activity, wherein the activity is at least one of: a meeting and a phone call, wherein the activity lasts for a period of time, wherein the actions performed by the application independent tracking module comprise:

tracking use of the calendar application during the period of time of the activity to determine when a calendar activity occurs, wherein the calendar activity comprises a meeting that is accessed by the calendar application;

tracking use of the telephone application during the period of time of the activity to determine when a phone activity occurs, wherein the phone activity comprises a phone call that occurs during the period of time of the activity;

tracking use of the document editing application during the period of time of the activity to determine when a document activity occurs, wherein the document activity comprises a document being accessed by the document editing application;

recording, in a metadata file of the tracking module, user access contextual information related to the activity and each of the calendar activity, the phone activity and the document activity that occurred during the period of time of the activity wherein a contextual link is created that associates the activity and each of the calendar activity, the phone activity, and the document activity that occurred during the period of time of the activity, wherein the contextual link includes a relevancy weight indicator at least based on a feedback indication received from a user selectively designating the contextual link as one of relevant and unrelated;

subsequent to the activity,
receiving an indication of subsequent access to at least one calendar activity, phone activity, and document activity that occurred during the activity;
automatically identifying the contextual link for the activity in the tracking module, and
presenting information about each activity tracked during the duration of the activity.

2. The computer-implemented method of claim 1, wherein the relevancy weight indicator is based on a number of occurrences of each of the calendar activity; phone activity; and document activity.

3. The computer-implemented method of claim 1, wherein the relevancy weight indicator is based on a display position of windows of the tracked applications.

4. The computer-implemented method of claim 1, wherein subsequent to the activity comprises determining a start time for a scheduled meeting.

5. The computer-implemented method of claim 1, wherein the document being accessed by the document editing application comprises at least one member of a group comprising: a note file, a word processing file, an internet file, an email file, a phone file, and an instant messaging file.

6. The computer-implemented method of claim 1, wherein the phone activity further comprises accessing a phone log.

7. The computer-implemented method of claim 1, wherein the tracked applications further comprise a messaging program.

8. A system for utilizing tracking module contextual information on a client device, the method comprising:
a processor; and
a memory having computer executable instructions stored thereon, wherein the computer-executable instructions are configured for:
providing an application independent tracking module on a client device, wherein the tracking module tracks different applications that are used on the client device; wherein the tracked applications comprise a calendar application, an telephone application and a document editing application;
the application independent tracking module performing actions relating to an activity, wherein the activity is at least one of: a meeting and a phone call, wherein the activity lasts for a period of time, wherein the actions performed by the application independent tracking module comprise:
tracking use of the calendar application during the period of time of the activity to determine when a calendar activity occurs, wherein the calendar activity comprises a meeting that is accessed by the calendar application;
tracking use of the telephone application during the period of time of the activity to determine when a phone activity occurs, wherein the phone activity comprises a phone call that occurs during the period of time of the activity;
tracking use of the document editing application during the period of time of the activity to determine when a document activity occurs, wherein the document activity comprises a document being accessed by the document editing application;
recording, in a metadata file of the tracking module, user access contextual information related to the activity and each of the calendar activity, the phone activity and the document activity that occurred during the period of time of the activity, wherein a contextual link is created that associates the activity and each of the calendar activity, the phone activity, and the document activity that occurred during the period of time of the activity, wherein the contextual link includes a relevancy weight indicator at least based on a feedback indication received from a user selectively designating the contextual link as one of relevant and unrelated;

subsequent to the activity,
receiving an indication of subsequent access to at least one calendar activity, phone activity, and document activity that occurred during the activity;
automatically identifying the contextual link for the activity in the tracking module, and
presenting information about each activity tracked during the duration of the activity.

9. The system of claim 8, wherein the relevancy weight indicator is based on a number of occurrences of each of the calendar activity; phone activity; and document activity.

10. The system of claim 8, wherein the relevancy weight indicator is based on a display position of windows of the tracked applications.

11. The system of claim 8, wherein subsequent to the activity comprises determining a start time for a scheduled meeting.

12. The system of claim 8, wherein the document being accessed by the document editing application comprises at least one member of a group comprising: a note file, a word processing file, an internet file, an email file, a phone file, and an instant messaging file.

13. The system of claim 8, wherein the tracked applications further comprise an email application and a web browser application.

14. A computer-readable storage medium having computer executable instructions stored thereon for utilizing tracking module contextual information on a client device, the computer executable instructions performing actions when executed, comprising:
providing an application independent tracking module on a client device, wherein the tracking module tracks different applications that are used on the client device; wherein the tracked applications comprise a calendar application, a telephone application and a document editing application;
the application independent tracking module performing relating to an activity, wherein the activity is at least one of: a meeting and a phone call, wherein the activity lasts for a period of time, wherein the actions performed by the application independent tracking module comprise:
tracking use of the calendar application during the period of time of the activity to determine when a calendar activity occurs, wherein the calendar activity comprises a meeting that is accessed by the calendar application;
tracking use of the telephone application during the period of time of the activity to determine when a phone activity occurs, wherein the phone activity comprises a phone call that occurs during the period of time of the activity;

tracking use of the document editing application during the period of time of the activity to determine when a document activity occurs, wherein the document activity comprises a document being accessed by the document editing application;

recording, in a metadata file of the tracking module, user access contextual information related to the activity and each of the calendar activity, the phone activity and the document activity that occurred during the period of time of the activity, wherein a contextual link is created that associates the activity and each of the calendar activity, phone activity and the document activity that occurred during the period of time of the activity, wherein the contextual link includes a relevancy weight indicator at least based on a feedback indication received from a user selectively designating the contextual link as one of relevant and unrelated;

subsequent to the activity, receiving an indication of subsequent access to at least one calendar activity, phone activity, and document activity that occurred during the activity;

automatically identifying the contextual link for the activity in the tracking module, and presenting information about each activity tracked during the duration of the activity.

15. The computer-readable storage medium of claim 14, wherein the relevancy weight indicator is based on a number of occurrences of each of the calendar activity, phone activity and document activity.

16. The computer-readable storage medium of claim 14, wherein the relevancy weight indicator is based on a display position of windows of the tracked applications.

17. The computer-readable storage medium of claim 14, wherein the tracked applications further comprise an email application and a web browser application.

* * * * *